(12) United States Patent
Cejka et al.

(10) Patent No.: US 12,123,707 B2
(45) Date of Patent: *Oct. 22, 2024

(54) SUPPORT STRUCTURE FOR VEHICLE ADAS CALIBRATION AND WHEEL ALIGNMENT MEASUREMENT SYSTEM

(71) Applicant: Hunter Engineering Company, St. Louis, MO (US)

(72) Inventors: Brian M. Cejka, Fenton, MO (US); Nicholas J. Colarelli, III, Frontenac, MO (US); Michael T. Stieff, Epworth, GA (US)

(73) Assignee: Hunter Engineering Company, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,271

(22) Filed: May 10, 2023

(65) Prior Publication Data

US 2023/0280155 A1 Sep. 7, 2023

Related U.S. Application Data

(63) Continuation of application No. 17/649,865, filed on Feb. 3, 2022, now Pat. No. 11,692,818, which is a
(Continued)

(51) Int. Cl.
*G01B 11/275* (2006.01)
*G01B 11/27* (2006.01)
(Continued)

(52) U.S. Cl.
CPC ........ *G01B 11/2755* (2013.01); *G01B 11/272* (2013.01); *G01M 17/06* (2013.01);
(Continued)

(58) Field of Classification Search
CPC .............. G01B 11/2755; G01B 11/272; G01B 2210/12; G01B 2210/143;
(Continued)

(56) References Cited

U.S. PATENT DOCUMENTS 5,535,522 A * 7/1996 Jackson ............. G01B 11/2755
33/203.18
5,782,003 A 7/1998 Bozzo
(Continued)

FOREIGN PATENT DOCUMENTS

DE 102013001449 A1 3/2014

OTHER PUBLICATIONS

International Search Report for corresponding PCT/US2017/053692 mailed Dec. 15, 2017.
(Continued)

*Primary Examiner* — Christina A Riddle
(74) *Attorney, Agent, or Firm* — Sandberg Phoenix & von Gontard P.C.

(57) ABSTRACT

A support structure having a vertical element supporting a set of cameras associated with a vehicle measurement or inspection system together with at least one target structure required for realignment or recalibration of onboard vehicle safety system sensors. A camera crossbeam carried by the support structure locates the set of cameras as required to view a vehicle undergoing measurement or inspection. The target structure is affixed to the vertical element of the support structure, at an elevation suitable for observation by at least one vehicle onboard sensors during a realignment or recalibration procedure. A set of rollers facilitates positioning of the target structure on a supporting floor surface during a realignment or recalibration procedure.

15 Claims, 8 Drawing Sheets

Related U.S. Application Data continuation of application No. 17/220,268, filed on Apr. 1, 2021, now Pat. No. 11,287,251, which is a continuation of application No. 16/813,329, filed on Mar. 9, 2020, now Pat. No. 10,996,053, which is a continuation of application No. 16/338,647, filed as application No. PCT/US2017/053692 on Sep. 27, 2017, now Pat. No. 10,634,488.

(60) Provisional application No. 62/406,659, filed on Oct. 11, 2016, provisional application No. 62/403,783, filed on Oct. 4, 2016.

(51) Int. Cl.
*G01M 17/06* (2006.01)
*G01S 7/40* (2006.01)
*G01S 7/497* (2006.01)

(52) U.S. Cl.
CPC .......... *G01S 7/4026* (2013.01); *G01S 7/4972* (2013.01); *G01B 2210/12* (2013.01); *G01B 2210/143* (2013.01); *G01B 2210/283* (2013.01); *G01S 7/4086* (2021.05)

(58) Field of Classification Search
CPC ............. G01B 2210/283; G01M 17/06; G01S 7/4026; G01S 7/4972; G01S 7/4086
USPC .............. 356/399–401, 3–6, 9, 11, 138, 139, 356/139.03–139.9, 139.1, 140–149, 356/152.1–155, 602–605, 610, 614–623; 33/203–203.21, 286, 288; 73/460; 382/151; 702/127, 150–154
See application file for complete search history.

(56) References Cited

U.S. PATENT DOCUMENTS

| | | | |
|---|---|---|---|
| 6,020,844 A * | 2/2000 | Bai | H01Q 3/02 342/75 |
| 6,498,959 B1 | 12/2002 | January | |
| 7,382,913 B2 | 6/2008 | Dorrane et al. | |
| 10,996,053 B2 * | 5/2021 | Stieff | G01S 7/4972 |
| 11,287,251 B2 * | 3/2022 | Stieff | G01B 11/2755 |
| 11,692,818 B2 * | 7/2023 | Cejka | G01B 11/272 356/400 |
| 2005/0096807 A1 | 5/2005 | Murray et al. | |
| 2006/0042380 A1 | 3/2006 | Douglas et al. | |
| 2011/0077900 A1 | 3/2011 | Corghi | |
| 2014/0293023 A1 | 10/2014 | Sherman | |
| 2015/0145999 A1 | 5/2015 | Kim | |

OTHER PUBLICATIONS

Written Opinion for corresponding PCT/US2017/053692 mailed Dec. 15, 2017.

* cited by examiner

SUPPORT STRUCTURE FOR VEHICLE ADAS CALIBRATION AND WHEEL ALIGNMENT MEASUREMENT SYSTEM

CROSS-REFERENCE TO RELATED APPLICATIONS

The present application is a continuation of, and claims priority from, U.S. patent application Ser. No. 17/649,865 filed on Feb. 3, 2022, which in turn is a continuation of U.S. patent application Ser. No. 17/220,268 filed on Apr. 1, 2021, now U.S. Pat. No. 11,287,251, which in turn is a continuation of U.S. patent application Ser. No. 16/813,329 filed on Mar. 9, 2020, now U.S. Pat. No. 10,996,053, and which in turn is a continuation of U.S. patent application Ser. No. 16/338,647 filed on Apr. 1, 2019, now U.S. Pat. No. 10,634,488. U.S. patent application Ser. No. 16/338,647 is the US National Stage under 35 U.S.C. § 371 et. seq. of International Application No. PCT/US2017/053692, filed on Sep. 27, 2017, which is related to, and claims priority from, both U.S. Provisional Patent Application Ser. No. 62/403,783 filed on Oct. 4, 2016, and U.S. Provisional Patent Application Ser. No. 62/406,659 filed on Oct. 11, 2016. Each of the aforementioned applications and patents is herein incorporated by reference.

STATEMENT REGARDING FEDERALLY SPONSORED RESEARCH

Not Applicable.

BACKGROUND OF THE INVENTION

The present application is related to a fixture for facilitating the calibration and alignment of vehicle safety system sensors, and in particular, to a movable fixture supporting vehicle wheel alignment system imaging sensors and at least one calibration or alignment target associated with a vehicle safety system sensor.

Vehicle wheel measurement systems, such as wheel alignment or inspection systems employing machine vision technology, such as cameras observing optical targets mounted on various surfaces within associated fields of view are well known in the vehicle measurement, alignment, and inspection industry. Typically, these type of systems employ two or four cameras, mounted to a crossbeam member on a fixture or structure located in front of a vehicle service area. The cameras are oriented such that each wheel of a vehicle to be inspected (or target mounted thereon) within the service area is visible to at least one of the cameras. The structure supporting the camera crossbeam may be fixed in place, or may be configured to be moved from one service area to another as needed. The camera crossbeam itself may be vertically (and/or rotationally) adjustable to accommodate vehicles at different elevations of a lift rack within the vehicle service. Images acquired by the cameras are conveyed to a wheel alignment processing system configured with suitable software instructions for image evaluation, determining various spatial measurements associated with the observed surfaces, and ultimately for identifying vehicle wheel alignment angles from associated spatial measurements.

When it is necessary to realign or recalibrate various vehicle safety system sensors, such as radar units or optical sensors typically utilized in forward collision avoidance systems or adaptive cruise control systems, specialized structures are precisely positioned in front of the vehicle, often with the aid of a vehicle measurement system such as a wheel alignment or inspection system. For example, U.S. Pat. No. 7,382,913 B2 to Dorrance describes a method and apparatus for guiding placement of a vehicle service apparatus relative to a vehicle, based on measurements acquired by a separate vehicle wheel alignment measurement system. Other techniques for guiding placement of a specialized structure relative to a vehicle undergoing a realignment or recalibration of a vehicle safety system sensor include the use of laser emitters and leveling devices, such as shown in U.S. Pat. No. 6,583,868 B2 to Hopfenmuller.

The particular type and configuration of onboard sensors utilized in the safety systems of vehicles vary between different vehicle manufacturers, and often, between different models of vehicles from the same manufacturer. Different types of onboard sensors have different realignment or recalibration procedures, and often requiring the specialized structures to be placed at different locations relative to the vehicle. In some cases, the placement of the specialized structures conflicts with the placement or positioning of the fixture or structure supporting the cameras associated with the vehicle measurement system.

Accordingly, there is a need to provide a positionable fixture or support structure capable of supporting both the set of cameras associated with a vehicle measurement system as well as the specialized structures required for realignment or recalibration of onboard vehicle safety system sensors, thereby reducing the total number of fixtures required to complete a vehicle onboard sensor realignment or recalibration, and eliminating potential spatial conflicts between support structures and specialized structures.

Some specialized structures or optical targets used in the alignment or calibration of onboard vehicle safety system sensors cannot be secured to the positionable fixture or support structure. Accordingly, there is a need to provide a system to guide an operator in the proper placement of those specialized support structures or optical targets relative to either the vehicle undergoing service or to the positionable fixture or support structure itself.

BRIEF SUMMARY OF THE INVENTION

Briefly stated, a first embodiment of the present disclosure sets forth a fixture or support structure having a vertical element supporting a set of cameras associated with a vehicle measurement system together with at least one target structure required for realignment or recalibration of onboard vehicle safety system sensors. A camera crossbeam carried by the fixture or support structure locates the set of cameras in a laterally spaced arrangement, as required to view wheels on each side of a vehicle undergoing measurement, and is optionally vertically (and/or rotationally) adjustable to accommodate the vehicle disposed at different elevations on an adjustable lift rack. The target structure is carried by the vertical element of the support structure, at an elevation suitable for observation by one or more vehicle onboard sensors during a realignment or recalibration procedure. To facilitate required positioning of the target structure during a realignment or recalibration procedure, the target structure incorporates one or more adjustable mountings, such as a sliding track or gimbal. Additionally, the fixture or support structure itself is configured with a set of rollers for movement across a supporting floor surface in forward proximity to the vehicle undergoing the measurement, inspection, or alignment service procedure.

A method of the present disclosure facilitates the positioning of fixture or support structure having a vertical element supporting a set of cameras associated with a vehicle measurement system together with at least one target structure required for realignment or recalibration of onboard vehicle safety system sensors. Initially, with the fixture or support structure disposed generally in front of a vehicle undergoing measurement, wheel alignment, or inspection, a set of images acquired by the cameras are conveyed to a processing system for evaluation, from which the relationship between the set of cameras and the observed surfaces on the vehicle is determined. Using the determined relationship, any required changes to the position of the fixture or support structure relative to the vehicle which are necessary to place and align the target structure relative to the onboard vehicle safety system sensors are identified. The fixture or support structure is then moved as required, either automatically or manually. Optionally, the elevation, lateral position, pitch, yaw, or roll of the target structure relative to the vertical element of the fixture or support structure is adjusted as required and/or permitted by associated mountings in combination with, or as an alternative to, movement of the fixture or support structure itself.

A further embodiment of the present disclosure sets forth a fixture or support structure having a vertical element supporting a set of cameras associated with a vehicle measurement system, together with at least one gimbaled optical projector disposed to project optical indicia onto a floor surface in proximity to the fixture or support structure for guiding relative placement of vehicle service components. A camera crossbeam carried by the fixture or support structure locates the set of cameras in a laterally spaced arrangement, as required to view wheels on each side of a vehicle undergoing measurement, wheel alignment, or inspection, and is optionally vertically (and/or rotationally) adjustable to accommodate the vehicle disposed at different elevations on an adjustable lift rack. The gimbaled optical projector is carried by the camera crossbeam structure, and is operatively coupled to a processing system configured with software instructions to selectively control an orientation of the optical projector about one or more axis of rotation, enabling projection of optical indicia onto the floor surface at selected locations relative to the vehicle or the support structure.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Figure 1:
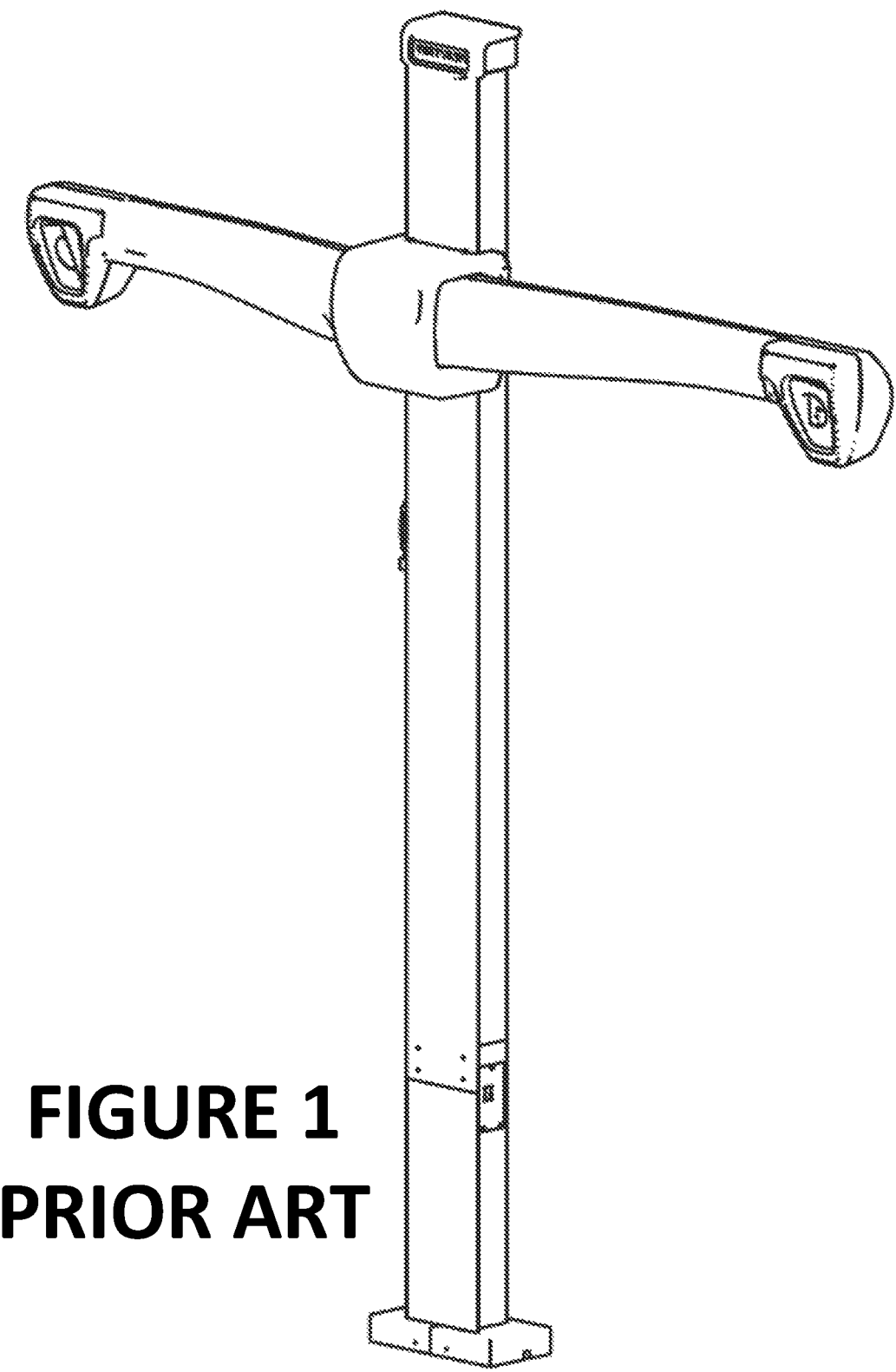
FIG. 1 is a perspective view of a prior art wheel alignment measurement system camera structure.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Figure 2:
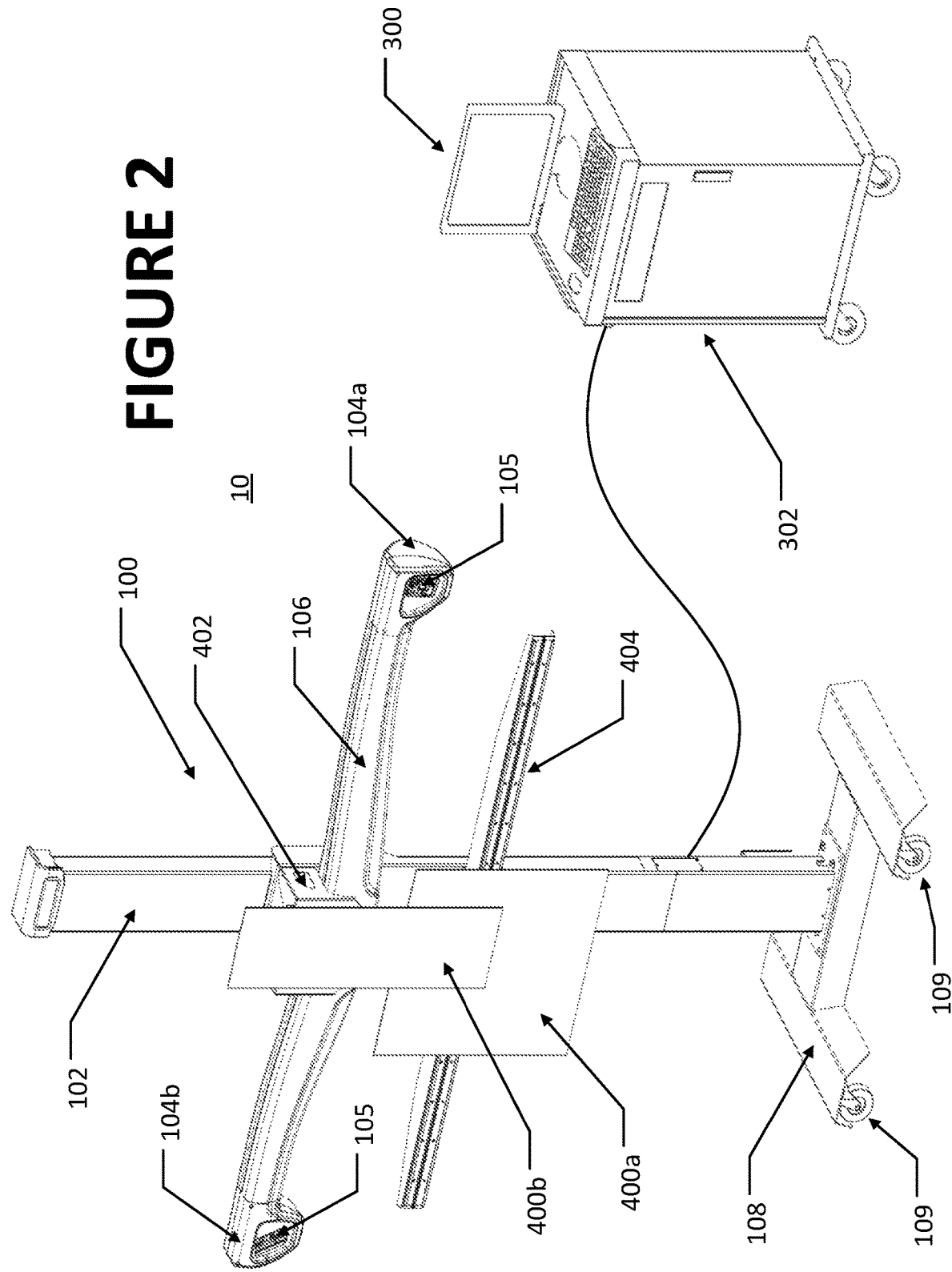
FIG. 2 is a perspective view of an embodiment of the present disclosure, illustrating a camera support structure configured with a pair of target structures.

Turning to the figures, and to FIG. 2 in particular, a vehicle measurement system instrumentation fixture or support structure 100 is shown, having a vertical column 102 supporting a set of laterally spaced camera modules 104*a*, 104*b* associated with a vehicle measurement system, such as a vehicle wheel alignment or inspection system, together with at least one vehicle calibration assistance structure, consisting of a specialized target structure 400*a*, 400*b*, and/or an optical projector 500, utilized to facilitate a process for realigning or recalibrating one or more safety system sensors onboard a vehicle 10 undergoing a service procedure. The safety system sensors onboard the vehicle 10 may be any type of sensors known in the art for use in vehicle safety systems, for example, digital cameras, an imaging sensor, a laser sensor (LIDAR), or a radar sensor. The safety system sensors may be paired with an emitter, such as a laser emitter, an optical emitter, or a radar emitter to illuminate a field of view which is observed by the associated safety system sensor.

On the support structure 100, a camera crossbeam 106 carried by the vertical column 102 locates the set of camera modules 104*a*, 104*b* adjacent opposite longitudinal ends, each containing one or more cameras 105 with fields of view in a generally forward direction as required to view each lateral side of the vehicle 10 undergoing service. The camera crossbeam 106 is optionally vertically (and/or rotationally) adjustable relative to the vertical column 102 to permit adjustments to accommodate elevation changes to the vehicle located on an adjustable lift rack (not shown) in proximity to the support structure 100. Vertical adjustments to the camera crossbeam 102 may be by any conventional means, such as sliding rails, rod and screw mechanisms, pulley mechanism, etc. The mechanism for vertical adjustments can be manually actuated, or may be driven by a suitable motor under either operator manual control or automatic software control. Rotational adjustments of the camera crossbeam about a longitudinal axis, if provided for, about the longitudinal axis of the crossbeam may be by any conventional means, and may be manually actuated, or may be driven by a suitable motor either under manual control of an operator or under automatic software control. As an alternative to rotationally adjusting the camera crossbeam 102, individual camera modules 104a, 104b may be optionally configured with suitable coupling mechanisms to permit multi-axis independent movement as required to achieve desired fields of view with the cameras 105.

It will be recognized that while the embodiments of the vehicle measurement system instrumentation structure illustrated in the Figures and described above utilize a vertical column 102 and a camera crossbeam 106, other configurations of a camera support structure 100 may be utilized without departing from the scope of the present invention. For example, in place of the vertical column 102 and camera crossbeam 106, a camera support structure 100 may consist of a pair of articulated camera support arms to position individual cameras in laterally spaced arrangements as required to achieve the fields of view necessary to observe features or targets associated with a vehicle undergoing a wheel alignment service, measurement, or inspection.

The camera modules 104a, 104b are operatively coupled to a processing system 300, which may be disposed in an associated console 302 in proximity to the fixture or support structure 100. The processing system 300 is configured with suitable logic circuit components and with software instructions for receiving image data from the camera modules 104a, 104b, evaluating the image data to identify relative spatial positions of observed surfaces, such as optical targets disposed on the wheels 12 or surfaces of a vehicle 10, and for computing associated vehicle characteristics, such as wheel alignment angles or vehicle body position. It will be understood that the configuration of the processing system 300, camera modules 104a, 104b, and console 302 are generally known in the art of machine vision vehicle wheel alignment systems, and may vary from the specific configuration described herein without departing from the scope of the invention, so long as the processing system 300 is capable of determining at least the spatial position of one or more observed surfaces associated with the vehicle relative to the camera modules 104a, 104b.

To facilitate alignment and calibration of safety system sensors onboard a vehicle, such as radar, LIDAR or optical sensors, one embodiment of the vehicle calibration assistance structure includes at least one target structure 400a and/or 400b affixed to the camera support structure 100, such as to the vertical column 102 or camera crossbeam 106, by a multi-axis mounting fixture 402. Each target structure 400a, 400b includes an observable target face oriented in a generally forward direction from the fixture or support structure 100 (i.e., towards the vehicle service area), at an elevation generally suitable for observation by the safety system sensors onboard the vehicle 10 during a realignment or recalibration procedure. The specific configuration of the target structures 400a, 400b, such as the target face features, is related to, and will vary with, the specific type of safety system sensor for which it will be used. For example, an optical target 400a having retro-reflective or contrasting target face surface features may be provided for use with optical safety system sensors such as cameras or LIDAR. Correspondingly, a metallic or radar-reflective target 400b may be provided for use with radar-based safety system sensors. Optionally, a laser emitter (not shown) configured for pivoting adjustment about at least one axis may be associated with the target structure 400a, 400b for use in illuminating a point or line on the vehicle or nearby floor surface to aiding in positioning and/or orienting either the target structure 400a, 400b individually, or the camera support structure 100 itself.

As seen in the various figures, multiple individual target structures of either the same or different types, may be secured to the vertical column 102 at different vertical elevations or horizontal separations.

Figure 3:
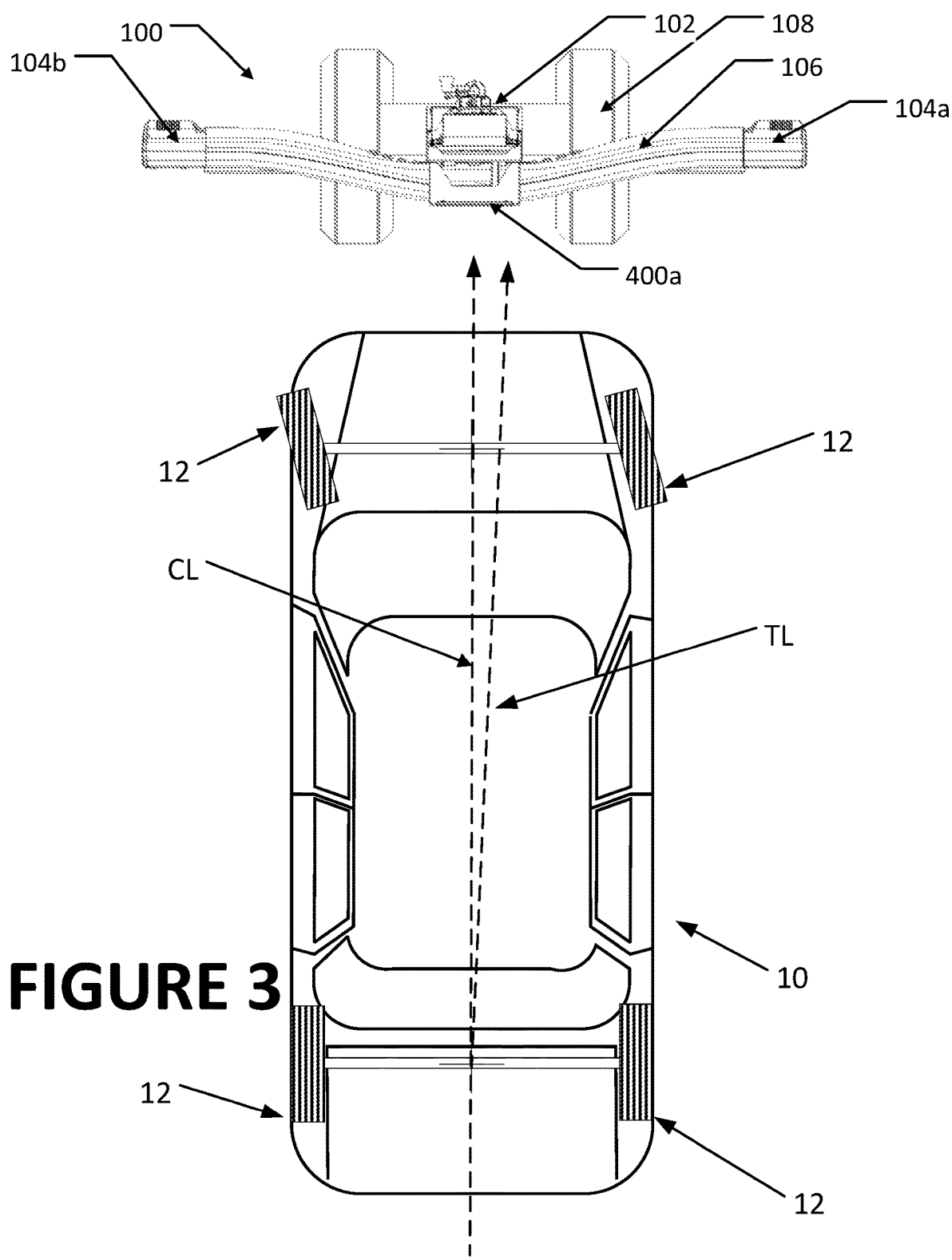
FIG. 3 is a top plan view of the camera support structure of FIG. 2 disposed in proximity to a vehicle undergoing a measurement, inspection, or wheel alignment service.
Figure 4:
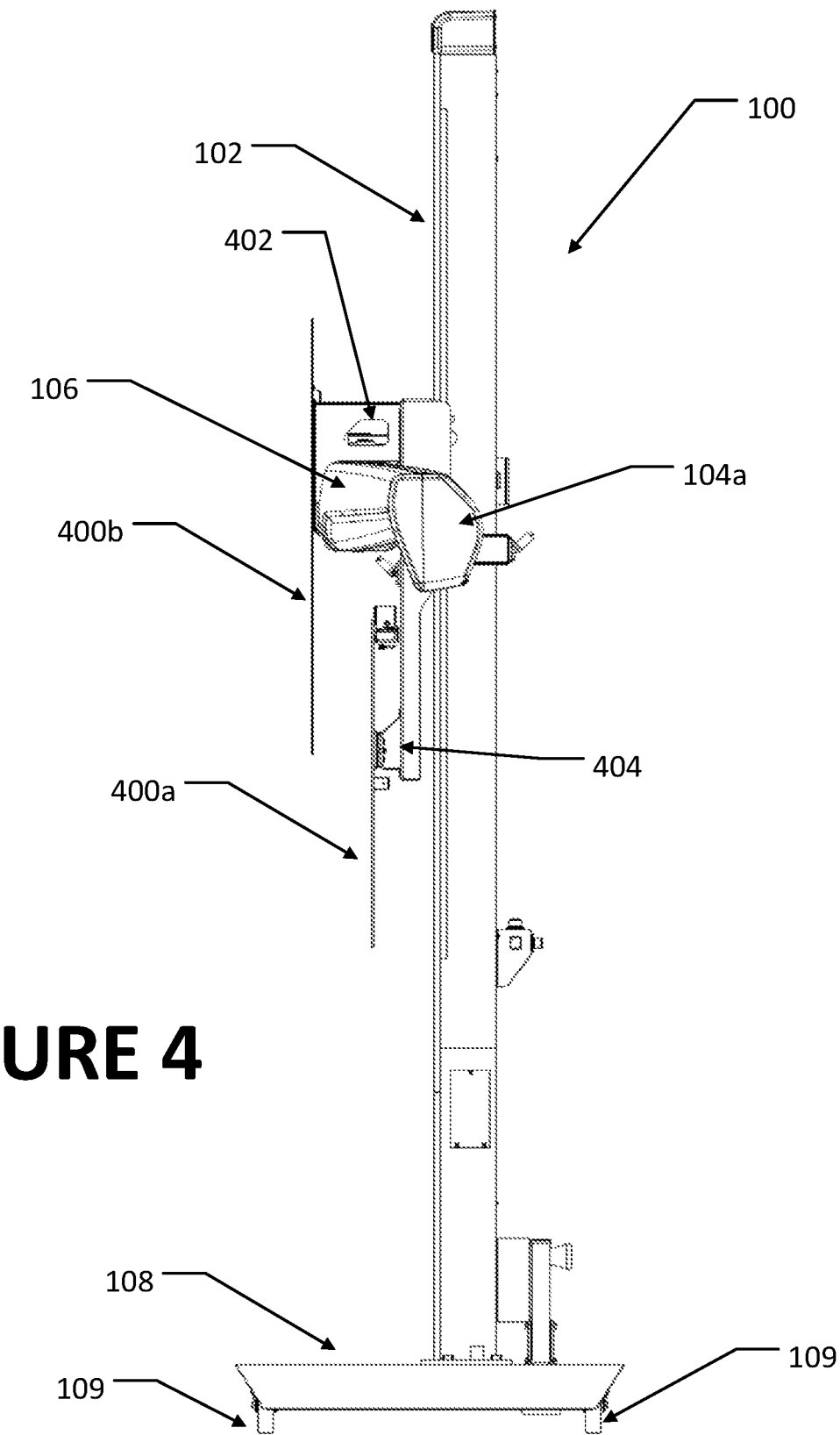
FIG. 4 is a side view of the camera support structure of FIG. 2.
Figure 5:
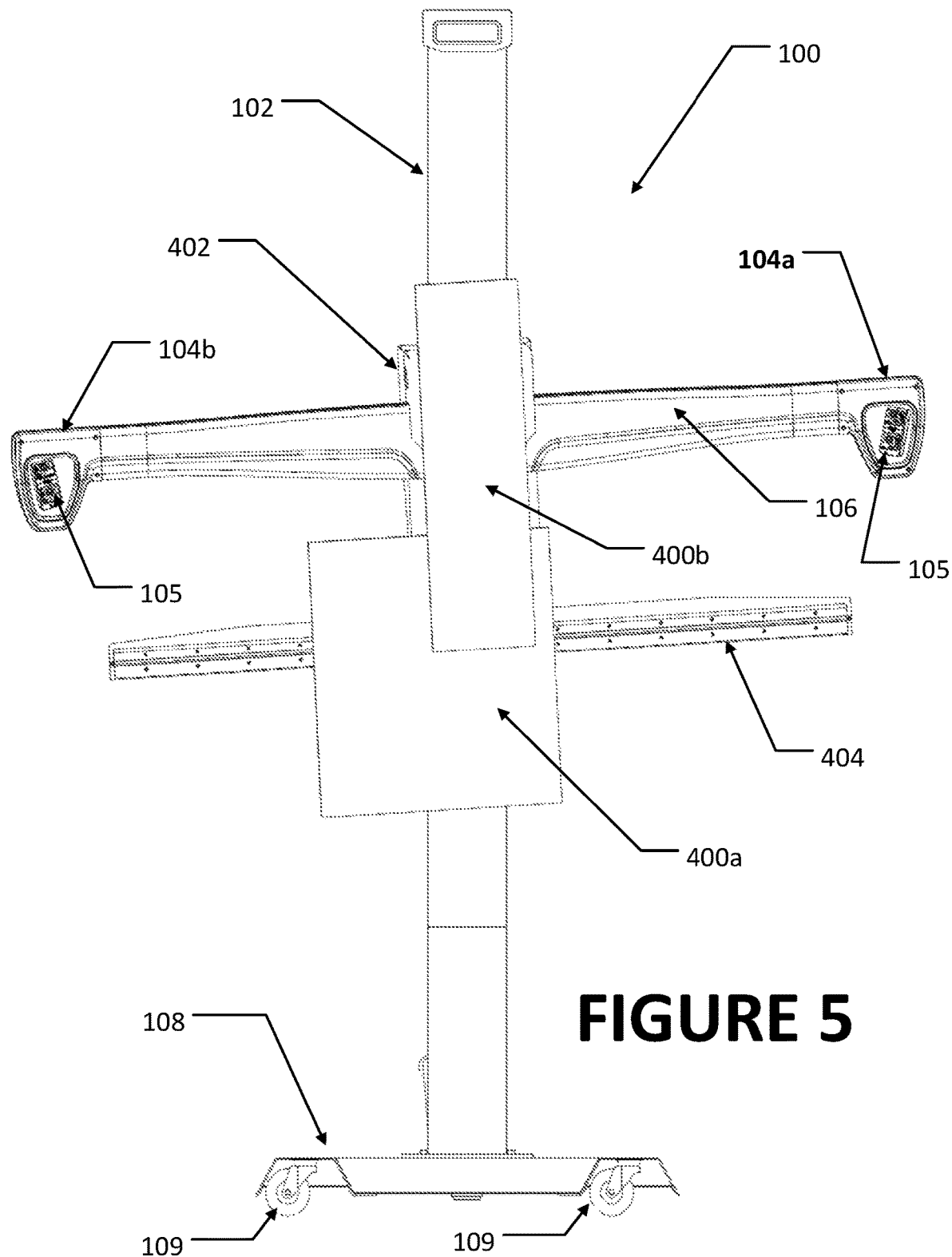
FIG. 5 is a front view of the camera support structure of FIG. 2, illustrating tilting adjustments to the camera support boom and target structures.

The mounting fixture 402 may be a fixed mount which secures the target structures 400a, 400b in a fixed position and orientation relative to the vertical column 102, or optionally, may include suitable multi-axis mechanisms for adjusting the lateral position, vertical position, and/or orientation of the target structures 400a, 400b over a limited range relative to the vertical column 102, such as may be required for safety system sensors offset from a vehicle centerline CL or thrust line TL after the fixture or support structure 100 is disposed generally in front of the vehicle, as seen in FIG. 3. For example, a lateral support track 404 shown in FIGS. 2-5 may be coupled to the mounting fixture 402, parallel to the camera crossbeam 106 to support a target structure for sliding movement, enabling a lateral position of a target structure 400a to be adjusted.

In one embodiment, to facilitate positioning of the fixture or support structure 100 generally at the vehicle centerline CL and to enable the set of camera modules 104a, 104b to view features on each lateral side of the vehicle 10, the fixture or support structure 100 is provided in one embodiment with a base structure 108 having a set of rolling elements, such as casters or wheels 109. During use, the fixture or support structure 100 is manually rolled into a position at a selected distance from the front of the lift rack or support surface on which the vehicle 10 is disposed during the measurement, inspection, or wheel alignment service procedure. Different vehicles may require the fixture or support structure 100 to be positioned at different locations relative to the vehicle. An optional locking mechanism may be provided on at least one of the rolling elements, to prevent accidental movement of the fixture or support structure 100 during use.

Precise position of the fixture or support structure 100 to place the target structure 400 in an ideal location for use may optionally be carried out under the guidance of the processing system 300 in response to data acquired through the processing of images acquired by the camera modules 104a, 104b. For example, with the fixture or support structure 100 positioned generally on the centerline CL of a vehicle 10 as seen in FIG. 3, the camera modules 104a, 104b can acquires images associated with the front and rear wheels 12 on each lateral side of the vehicle, from which the processing system 300 can identify the position of the fixture or support structure relative to either a geometric centerline CL or a thrust line TL of the vehicle 10. If adjustments to the position of the fixture or support structure 100 relative to either the vehicle's geometric centerline CL or thrust line TL are required, suitable guidance can be provided to the operator by the processing system 300 based on the determined relative position of the fixture or support structure. The guidance may be in any of a variety of formats, such numerical (i.e., 2" to the left), symbolic (i.e., an indication arrow and/or sliding bar graph), or audible (i.e., a tone or sound when the correct position is reached). The guidance may be static guidance, in which no updates to the position data are acquired until the fixture or support structure is stationary, or alternatively, the guidance may be dynamic, in which the processing system 300 receives images from the camera modules 104a, 104b during movement of the fixture or support structure, and provides sequentially updated or "live" instructions to the operator to aid in precise positioning of the fixture or support structure relative to the vehicle 10.

It will be recognized that positioning of the fixture or support structure 100 may, in an alternative embodiment, be automated and under control of the processing system 300 via commands to suitable mechanical drive mechanisms, such as stepper motors, for driving the rolling elements or other means of machine controlled locomotion.

Positioning of the fixture or support structure 100, if adjustable, may be along just a single axis which is generally transverse to the vehicle centerline CL (i.e., from side to side), or may additionally be along a second axis which is generally parallel to the vehicle centerline CL (i.e., towards or away from the vehicle). A vertical height of the set of the camera modules 104a, 104b may optionally be adjusted by raising or lowering the camera crossbeam 106 along the vertical column 102.

Once the fixture or support structure is positioned at a desired location relative to the vehicle 10, adjustments to the position and orientation of the target structure 400a, 400b relative to the vertical column 102 for proper placement within a field of view associated with the onboard vehicle safety system sensors can via the mounting fixture 402. Suitable adjustment mechanisms within the mounting fixture 402 may include, but are not limited to, ball and socket connections, pivot arms, and the sliding rail or track 404. With the target structure 400a, 400b positioned at the desired location relative to the vehicle, and more specifically, relative to an onboard vehicle sensor, measurement, alignment, or calibration of the onboard vehicle sensor can proceed as understood in the art, by observing or illuminating the target structure 400 and responding accordingly.

Figure 6:
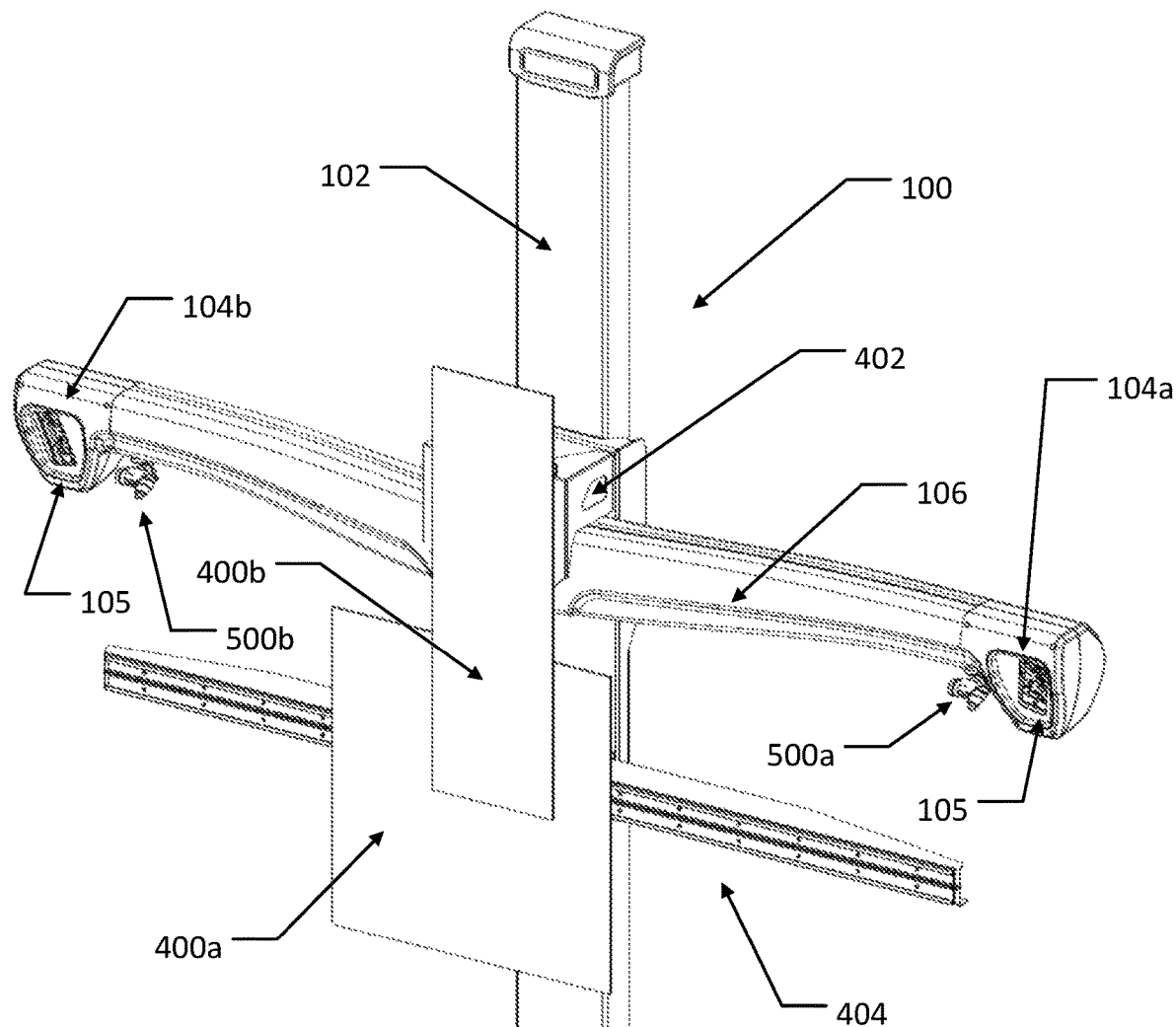
FIG. 6 is a perspective view of an alternate embodiment of the present disclosure, illustrating a camera support structure configured with a pair of target structures together with a pair of gimbal-mounted optical projectors.
Figure 7:
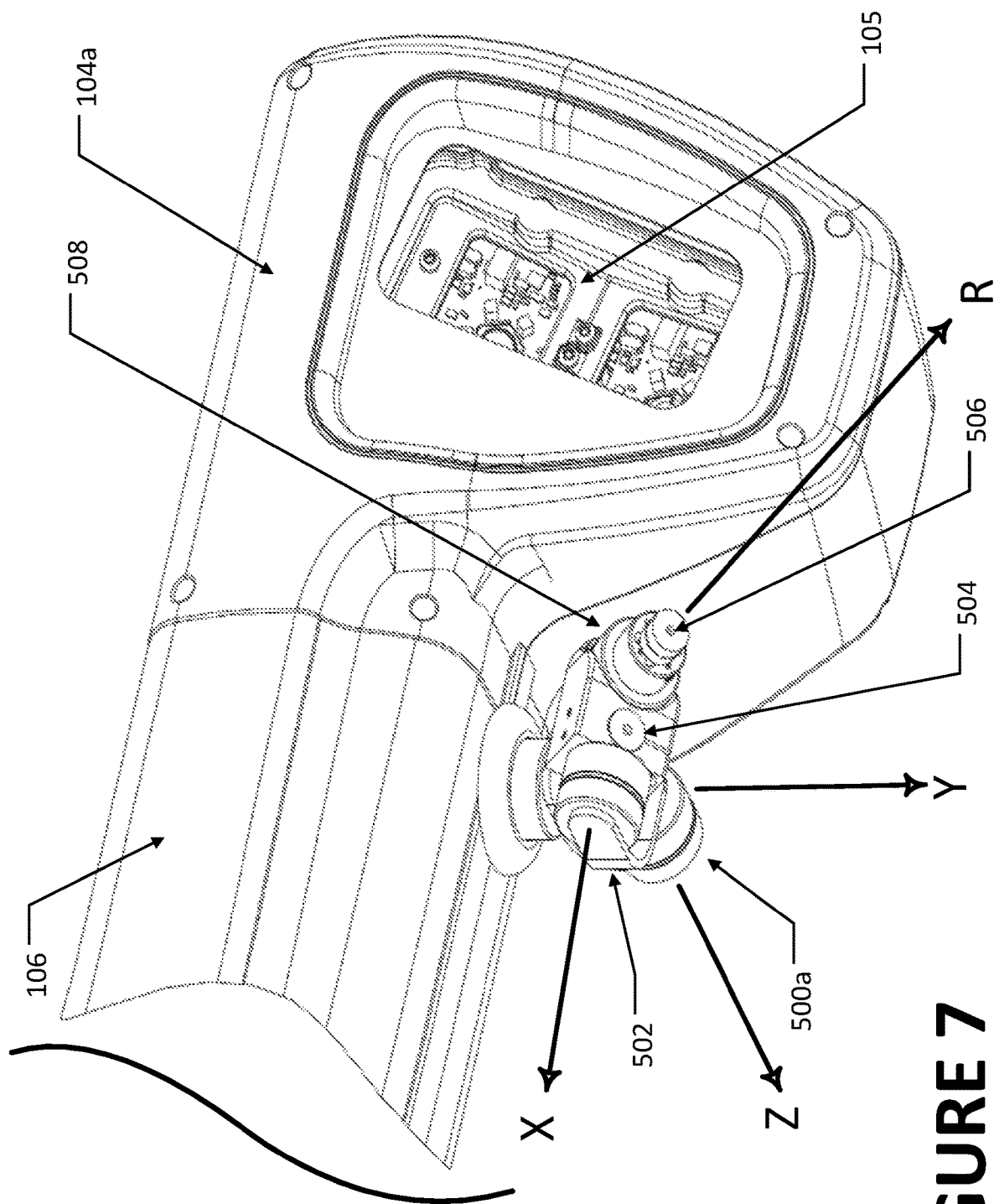
FIG. 7 is a close-up perspective view of a gimbal-mounted optical projector of FIG. 6.
Figure 8:
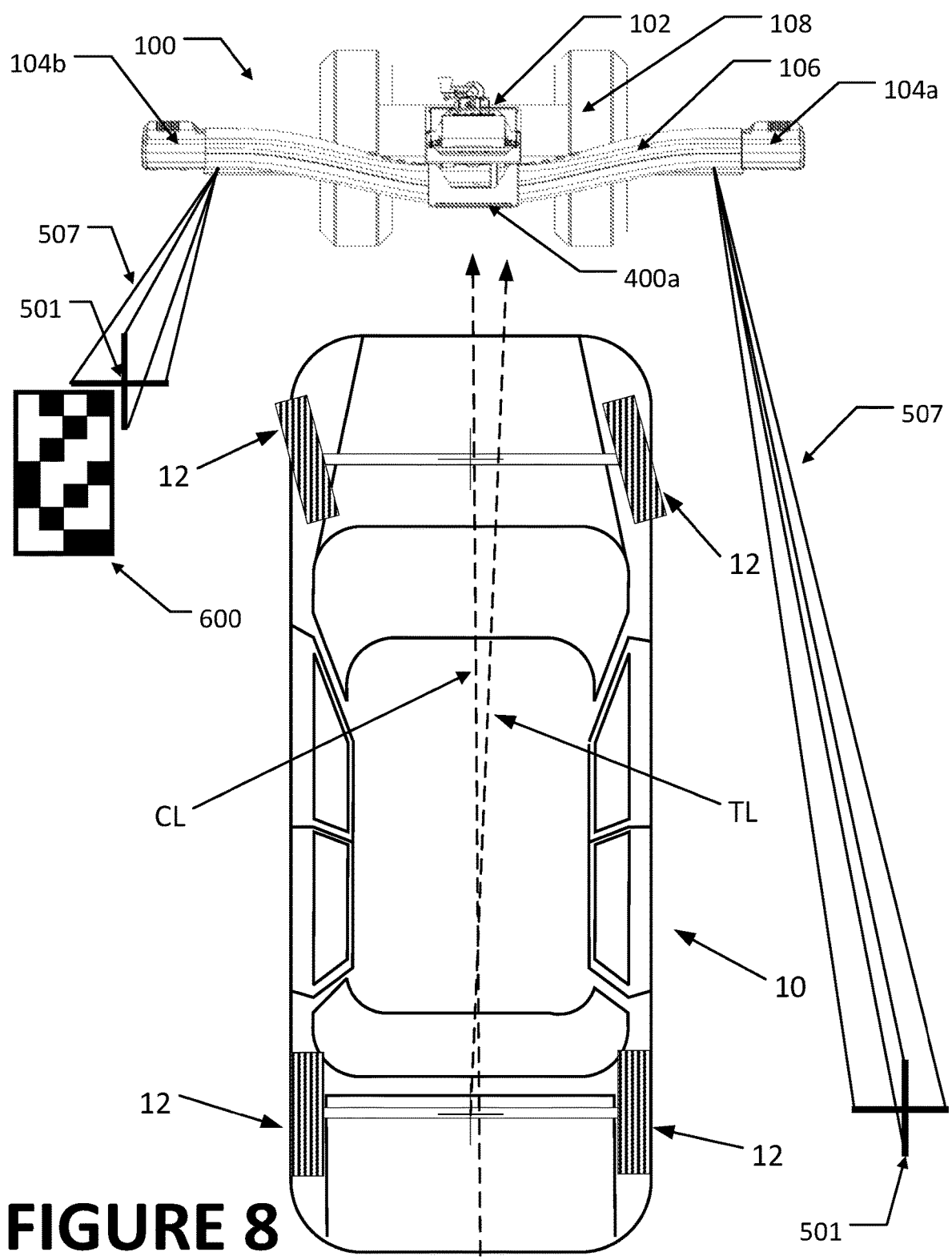
FIG. 8 is a top plan view similar to FIG. 3, illustrating optical indicia projected with the optical projectors of FIG. 6.

In a further embodiment illustrated in FIGS. 6-8, the vehicle calibration assistance structure includes one or more optical projectors 500 operatively coupled to, and under control of, the processing system 300, for the projection of visible indicia 501 on to surfaces in proximity to the fixture or support structure, utilized to aid in the placement or alignment of vehicle service fixtures or targets. The optical projectors 500 illustrated in FIG. 6-8 comprise a pair of laser modules 500a and 500b, mounted on a set 502 of motorized gimbal structures secured to the camera support beam 106. The laser modules 500a, 500b are disposed in a laterally spaced arrangement, in proximity to the camera modules 104a and 104b, enabling projection of visible indicia onto surfaces adjacent each lateral side of the vehicle 10 located within the vehicle service area, as shown in FIG. 8.

As best seen in FIG. 7, each laser module 500a, 500b includes at least one laser emitter 504 secured to the set 502 of motorized gimbal structures for rotational movement about three orthogonal axis (X, Y, Z). Optionally, a second laser emitter 506 is supported by a rotating element 508 on the mounting structure 502, for rotation about an additional axis R, enabling projected indicia to be visually corrected for parallax distortion resulting from non-orthogonal projection orientations. The laser emitters 504 and 506 each transmit beams 507 of visible light through associated optical focusing elements to project the visible indicia in the form of spots or lines, onto the surfaces. It will be recognized that the optical projectors 500 may utilized other sources of visible light, such as LED elements, and associated optical focusing elements in place of the laser emitters 504, 506 to project visible indicia onto the surfaces without departing from the scope of the present disclosure. Furthermore, the specific number of axis about which the optical projectors 500 are configured for movement may vary based on the intended use of the projected visible indicia. For example, optical projectors 500 intended to project visible indicia at a fixed location relative to the fixture or support structure 100 may be mounted in a fixed orientation, while optical projectors such as 500a and 500b which are intended to project visible indicia relative onto surfaces at locations relative to an initially indeterminate vehicle location are mounted for rotational movement about multiple axis.

During a vehicle wheel alignment service, measurement, or inspection procedure, the processing system 300 is configured to control the set 502 of multi-axis gimbal mounting structures, and optional rotating element 508, to orient each laser emitter 504, 506 to project the observable indicia 501 at a selected location on a surface in proximity to the fixture or support structure 100. The observable indicia 501 may represent a stationary point location to aid in the placement of a vehicle service fixture, or may represent lines or boundaries against which an elongated planar optical target 600 or other vehicle service device may be aligned. The processing system 300 may optionally control the set of multi-axis gimbal mounting structures to impart motion to the projected indicia, such as to sequentially illuminate two or more discrete locations on said surface. Indicia other than points or lines, such as alphanumeric symbols, or raster images, may be projected under control of the processing system 300 from suitably configured optical projectors 500 within the scope of the present disclosure.

The selected location of the observable indicia 501 on the surface may be determined by the processing system 300 in response to spatial measurements of associated with the vehicle 10 acquired from images captured by the camera modules 104, or may be selected to be relative to a component of the fixture or support structure 100, such as an axis of the support column 102. For example, some vehicle safety system sensor calibration procedures require the placement of target structures, observable by onboard vehicle safety system sensors, at select locations relative to the vehicle. Specific placement requirements associated with safety system calibration procedures for a variety of vehicle makes and models may be stored in a database accessible to the processing system 300. After determining measurements associated with the relative spatial position of the vehicle 10 to the fixture or support structure 100, such as by conventional machine vision vehicle alignment measurement procedures, the processing system 300 is configured to access the accessible database to recall the specific placement requirements for visible targets or calibrations fixtures associated with the vehicle. Utilizing the recalled placement requirements, the processing system 300 operates the set 502 of motorized gimbal mounting structures to orient the optical projectors to project visible indicia at the appropriate locations on the floor surface of the vehicle service area, enabling an operator to carry out or complete a vehicle service, calibration, or inspection procedure.

In addition to operating the set of motorized gimbal mounting structures to orient the optical projectors to project the visible indicia at the selected locations on the floor surface, the processing system 300 may be further configured to provide for motion stabilization of the projected visible indicia in response to movement of the fixture or support structure 100. Motion stabilization, via control of the set of motorized gimbal mounting structures, may be provided by the processing system 300 to maintain the projected visible indicia at the selected location during movement of the base 108 across the floor surface, as well as during vertical movement of the camera crossbeam 106.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A vehicle measurement system, comprising:
    a crossbeam carried for vertical adjustment along a column, said crossbeam supporting at least two laterally spaced camera modules, each of said camera modules including at least one camera aligned with an associated field of view oriented in a forward direction towards a vehicle service area;
    at least one target carried on said crossbeam, said at least one target having an observable target face oriented in said forward direction towards said vehicle service area;
    a processor configured with software instructions to receive image data from said cameras and to evaluate said image data to determine a plurality of vehicle characteristics associated with a vehicle within said associated fields of view, said plurality of vehicle characteristics including at least one wheel alignment angle measurement and a relative spatial position of said vehicle to said vehicle measurement system;
    an adjustment mechanism, configured to alter at least a vertical position of said crossbeam; and
    wherein said processor is further configured with additional software instructions to actuate said adjustment mechanism to alter at least said vertical position of said crossbeam responsive to one or more of said determined plurality of vehicle characteristics.

2. The vehicle measurement system of claim 1 wherein a first camera module and a second camera module are each disposed adjacent an opposite longitudinal end of said crossbeam.

3. The vehicle measurement system of claim 1 further including a second target carried on said crossbeam independent of said at least one target, said second target having a second observable target face orientated substantially in said forward direction towards said vehicle service area.

4. The vehicle measurement system of claim 1 wherein said observable target face includes at least one retro-reflective surface feature.

5. The vehicle measurement system of claim 1 wherein said observable target face includes at least one contrasting surface feature.

6. The vehicle measurement system of claim 1 wherein said observable target face is radar reflective.

7. The vehicle measurement system of claim 1 wherein said at least one target is supported for sliding movement parallel to said crossbeam.

8. The vehicle measurement system of claim 1 further including a base structure, said base structure having a set of wheels for movement across a floor surface; and wherein said column is secured to said base.

9. The vehicle measurement system of claim 8 wherein said processor is further configured with software instructions to guide positioning of said base structure on said floor surface in response to said at least one measurement of said relative spatial position of said vehicle to said vehicle measurement system.

10. A method for positioning a vehicle safety system sensor target carried by a support structure of a vehicle measurement system, comprising:
    capturing images with at least one camera carried on said support structure, of surfaces and/or features associated with a vehicle disposed within a vehicle service area;
    evaluating, within a processing system, said captured images to identify a plurality of vehicle characteristics, said identified vehicle characteristics including at least one wheel alignment angle measurement and a spatial relationship between said support structure and said vehicle;
    guiding, with said processing system, an alteration of said spatial relationship between said support structure and said vehicle by changing a position of said support structure within said vehicle service area in response to said identified vehicle characteristics; and
    aligning said vehicle safety system sensor target relative to said vehicle by altering, in response to guidance from said processing system, at least an elevation, a lateral position, or an orientation of said vehicle safety system sensor target on said support structure.

11. The method of claim 10 wherein said at least one measurement of said spatial relationship between said support structure and said vehicle identifies a position of said support structure relative to either a geometric centerline of said vehicle or a thrust line of said vehicle.

12. A vehicle measurement system, comprising:
    a base;
    a column extending longitudinally upward from said base;
    a lateral member coupled to said column by an adjustment mechanism configured to move said lateral member at least vertically relative to said column;
    a first camera module secured to a first lateral end of said lateral member, and a second camera module secured to a second lateral end of said lateral member,
    wherein each of said camera modules includes at least one camera having an associated field of view oriented in a forward direction towards a vehicle service area;
    a processor configured to receive image data from each camera, said processor configured with software instructions to evaluate said image data to determine at least one alignment angle measurement associated with a vehicle located within said associated fields of view and a spatial relationship between said support structure and said vehicle;
    at least one target coupled to said support structure by said adjustment mechanism;
    wherein said processor is further configured with software instructions to actuate said adjustment mechanism to alter at least a vertical position of said lateral member and said at least one target structure in response to said determined measurements.

13. The vehicle measurement system of claim 12 wherein said target includes an observable face oriented substantially in said forward direction towards said vehicle service area.

14. The vehicle measurement system of claim 12 wherein said base includes wheels for movement across a floor surface; and
   wherein said processor is further configured with software instructions to provide an output through an operator interface directing a movement of said support structure across said floor surface, said output responsive to said at least one measurement of a spatial relationship between said support structure and said vehicle.

15. A vehicle measurement system, comprising:
   a support column extending longitudinally in a vertical orientation;
   a crossbeam coupled to said support column by an adjustment mechanism configured to enable at least vertical movement of said crossbeam relative to said support column;
   a pair of camera modules secured in a laterally spaced arrangement to said crossbeam, each of said camera modules including at least one camera aligned such that associated fields of view are oriented in a forward direction towards a vehicle disposed within a vehicle service area;
   a processing system operatively coupled to said cameras to receive image data therefrom, said processing system having a processor configured with software instructions to evaluate said image data to determine at least one wheel alignment angle measurement for said vehicle and a spatial relationship between a feature of said vehicle measurement system and said vehicle;
   at least one target secured to said crossbeam; and
   wherein said processing system is operatively coupled to said adjustment mechanism and is further configured with software instructions to actuate said adjustment mechanism to vertically move said crossbeam along said support column responsive to said spatial relationship between said feature and said vehicle.

* * * * *